United States Patent [19]

Covington et al.

[11] 4,112,545

[45] Sep. 12, 1978

[54] METHOD AND APPARATUS FOR FORMING TORN, RANDOM SIZE PIECES OF SAUSAGE MEAT

[75] Inventors: Wayne L. Covington; Glen R. Green, both of Ontario, Oreg.

[73] Assignee: Ore-Ida Foods, Inc., Boise, Id.

[21] Appl. No.: 765,100

[22] Filed: Feb. 3, 1977

[51] Int. Cl.[2] ............................................. A22C 7/00
[52] U.S. Cl. ......................................... 17/45; 17/32
[58] Field of Search .................. 17/32, 45, 1 R, 35; 131/109 R; 426/105, 327

[56] References Cited

U.S. PATENT DOCUMENTS

| | | | |
|---|---|---|---|
| 2,879,904 | 3/1959 | Walsh et al. | 131/109 R |
| 2,888,351 | 5/1959 | Olson et al. | 426/105 |
| 2,889,574 | 6/1959 | Thielen et al. | 17/39 |
| 3,183,780 | 6/1965 | Mead | 17/32 |
| 3,276,452 | 10/1966 | Dearsley | 131/109 R |
| 3,373,783 | 3/1968 | Spangler | 17/32 |
| 3,404,430 | 10/1968 | Kielsmeier et al. | 17/45 |
| 3,428,001 | 2/1969 | Zwart, Jr. et al. | 17/32 |
| 3,504,639 | 4/1970 | Lilirn | 17/32 |
| 3,535,735 | 10/1970 | Egee | 17/32 |
| 3,589,915 | 6/1971 | Lustig | 426/105 |
| 3,800,362 | 4/1976 | Wilson | 17/32 |

*Primary Examiner*—Louis G. Mancene
*Assistant Examiner*—Paul J. Hirsch
*Attorney, Agent, or Firm*—Mallinckrodt & Mallinckrodt

[57] ABSTRACT

Chopped or ground sausage meat or like material is extruded as a continuous column into the path of action of a set of wipers which individually sweep across different fractional portions of the extrusion opening, thereby tearing respective random size chunks of material from the column being extruded. The chunks are primarily useful as pizza topping and may be frozen and stored for that purpose. The set of wipers is preferably provided as a plurality of radial arms rotatably mounted at intervals about a common axis and offset laterally from one another, so that free extremities of the arms act as tearing fingers as they sweep past respective fractional portions of the extrusion opening.

8 Claims, 8 Drawing Figures

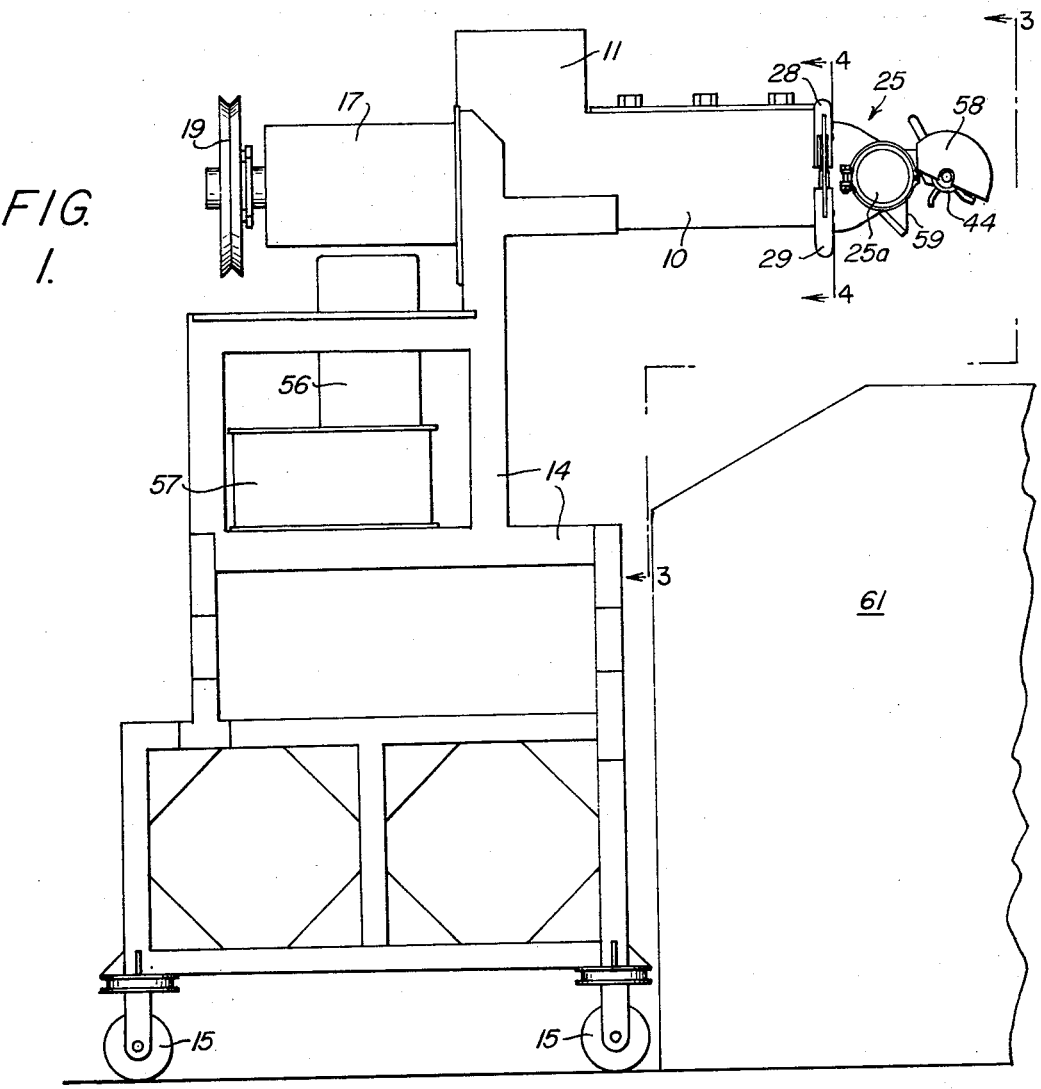
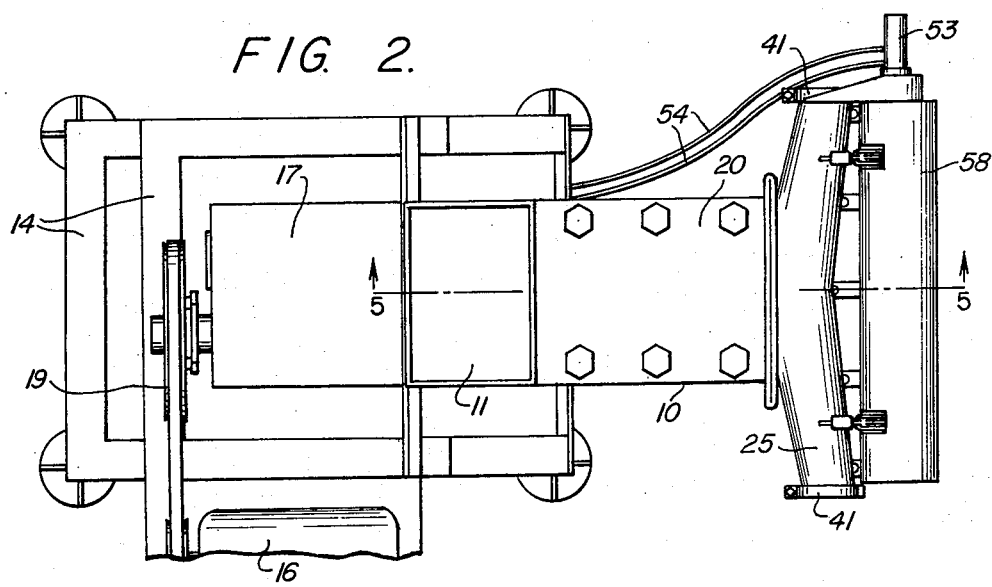

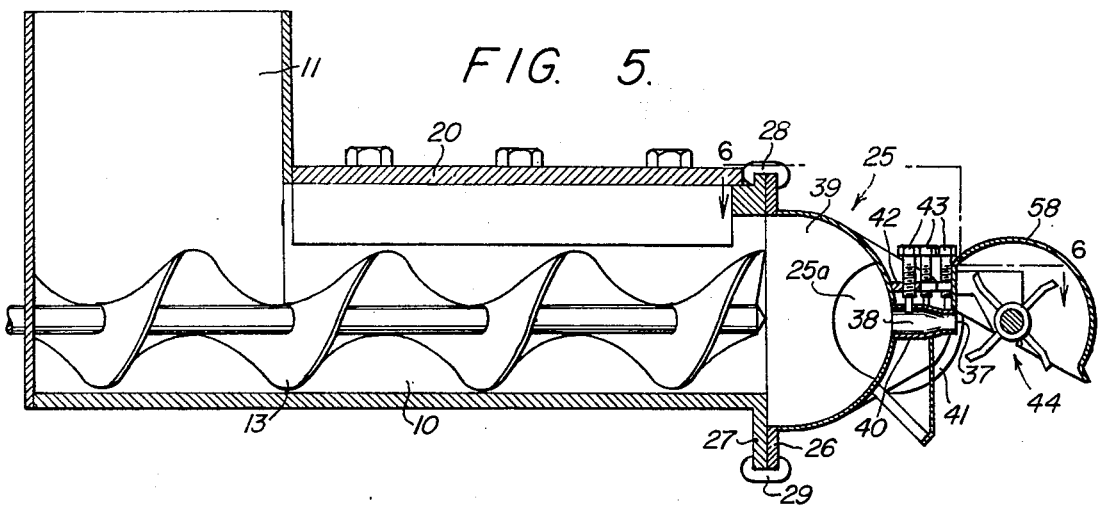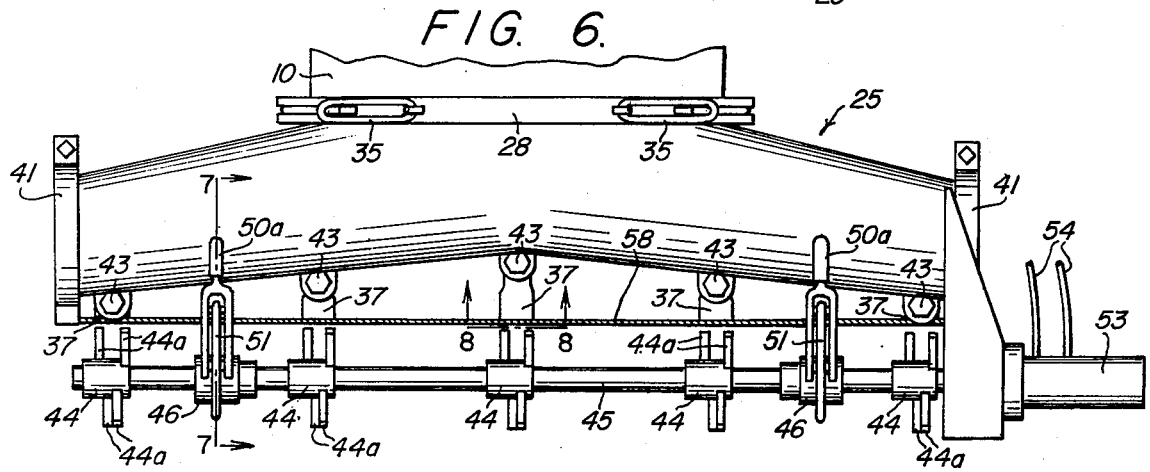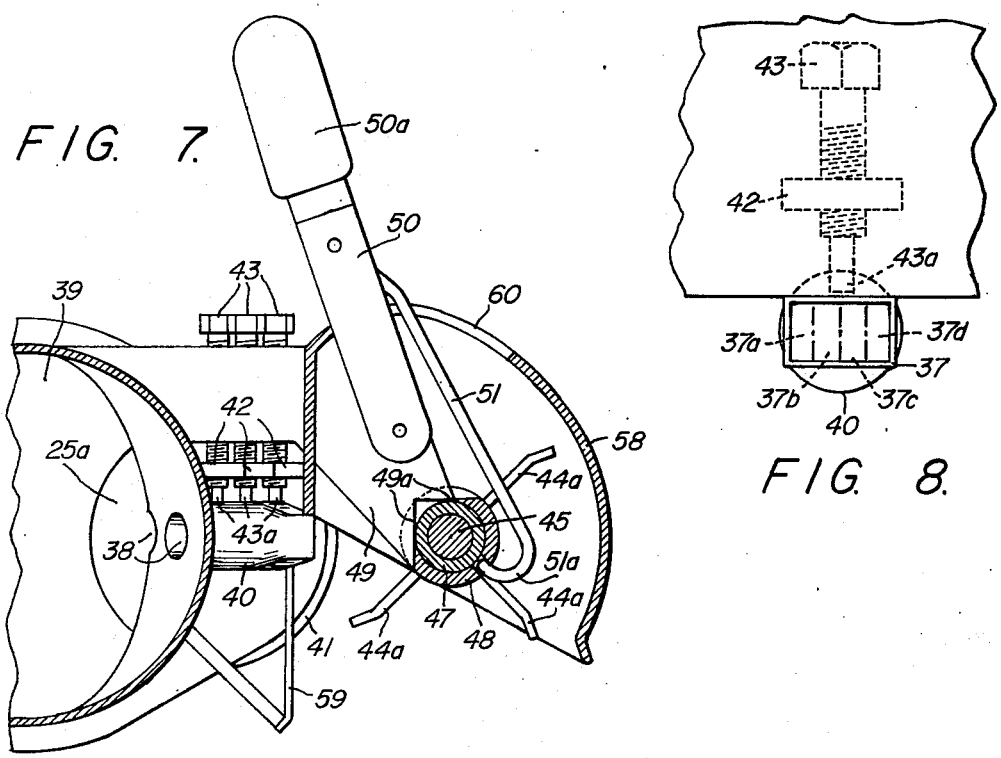

METHOD AND APPARATUS FOR FORMING TORN, RANDOM SIZE PIECES OF SAUSAGE MEAT

BACKGROUND OF THE INVENTION

1. Field

The invention is in the field of methods and machines for extruding a chopped or ground meat material and dividing the extruded material transversely into pieces.

2. State of the Art

Machines are available for extruding a chopped or ground meat material into sausage casings to produce conventional sausages. There are also machines which extrude food products and cut the extruded column transversely into pieces. Such machines produce pieces of uniform size, shape, and weight.

It has been found that pieces of uniform size, shape, and weight are not desirable for certain uses. For example, in the production of sausage pieces for use as pizza topping it is desirable to have torn pieces that are randomly sized and shaped. In the many pizza parlors around the country and even in the mass production of frozen pizza, random sizing and shaping of sausage pieces have been heretofore accomplished by hand-plucking bits of sausage from a large mass of sausage meat. When machines have been used, the sausage pieces produced have been of uniform size and shape. Market surveys have shown that this detracts from marketability of frozen, sausage-topped pizzas.

SUMMARY OF THE INVENTION

According to the invention, pieces of chopped or ground sausage meat or like material of random size and shape and having a desirable torn appearance, are produced by extruding the material through the opening of an extrusion die as a continuous column and by successively passing individual wipers of a set of same across respectively different fractional portions of the extrusion opening, thereby tearing respective chunks of the meat material from the column being extruded. The wipers are repeatedly passed across the extrusion opening during the time that the material is being extruded, and the pieces are chunks wiped from the column are preferably collected on a conveyor belt as they fall from the column and deep frozen for subsequent use.

Apparatus for carrying out the method comprises an extrusion head, having at least one extrusion opening, and means for extruding the material through the opening. A set of wipers is arranged to individually and successively sweep across respective different fractional portions of the extrusion opening, so as to tear and separate rough chunks of meat material from the extruded column across the transverse cross-sectional area thereof. Although the set of wipers can be provided in various ways, it is presently preferred to utilize a rotary set of radial arms mounted at intervals about a common axis and offset laterally from one another. Free extremities of the arms are adapted to act as tearing fingers as they wipe across the extrusion opening.

THE DRAWINGS

In the accompanying drawings, which illustrate an embodiment of the machine presently contemplated as the best mode of carrying out the invention:

FIG. 1 represents a side elevation of the machine;
FIG. 2, a top plan;
FIG. 3, a fragmentary front elevation taken from the standpoint of the lines 3—3 of FIGS. 1 and 2, respectively, and drawn to a considerably larger scale, the cover over the wiper arms being omitted for convenience of illustration;
FIG. 4, a fragmentary, transverse, vertical section taken on the line 4—4 of FIG. 1 and drawn to a larger scale;
FIG. 5, a fragmentary, longitudinal, vertical section taken on the line 5—5 of FIG. 2 and drawn to a scale somewhat smaller than that of FIG. 4;
FIG. 6, a fragmentary, horizontal section partly in top plan as taken on the line 6—6 of FIG. 5;
FIG. 7, a fragmentary, longitudinal, vertical section taken on the line 7—7 of FIG. 6 and drawn to a larger scale; and
FIG. 8 a fragmentary, transverse, vertical section taken on the line 8—8 of FIG. 6 and drawn to a larger scale, hidden parts being shown by dotted lines and the sweeps of the respective wipers across the extrusion opening being indicated by relatively heavy broken lines.

DETAILED DESCRIPTION OF THE ILLUSTRATED EMBODIMENT

Figure 4:
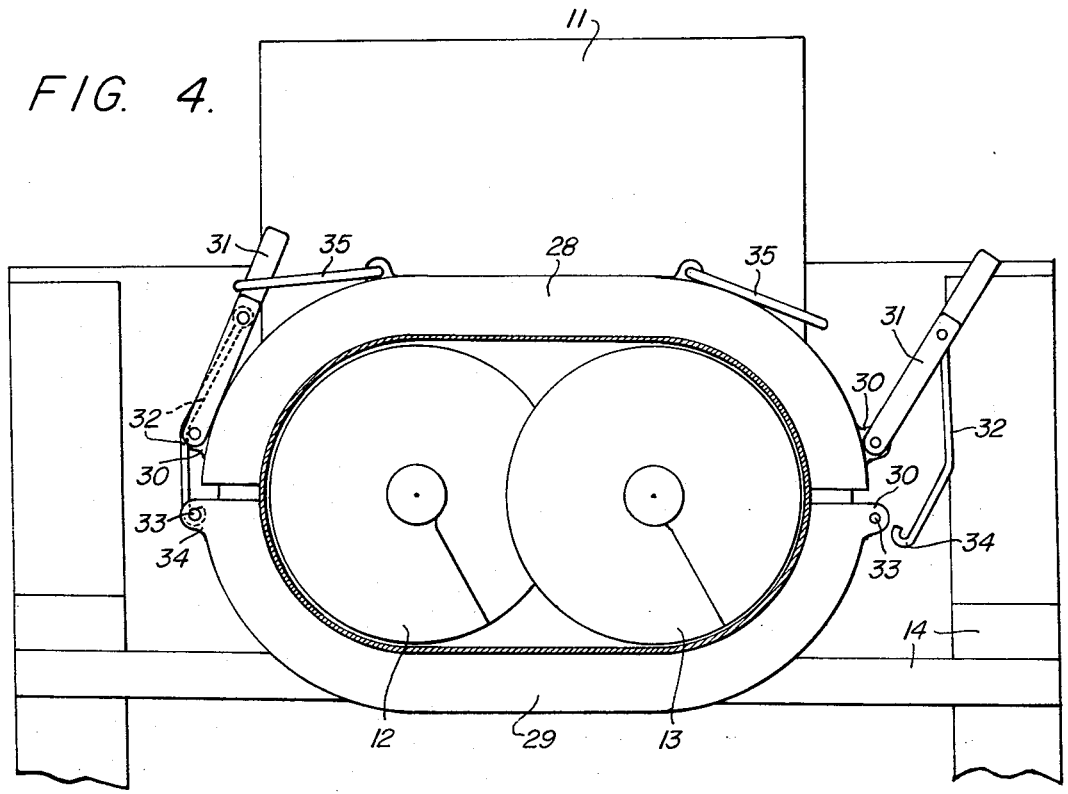

In its illustrated form the machine of the invention includes a standard, twin screw, meat augar mechanism 10, FIGS. 1, 2, and 5, having a hopper 11 for receiving meat to be extruded and for feeding it to the twin screws 12 and 13, FIG. 4 (see also FIG. 5), of such mechanism. In this instance, mechanism 10 is mounted on a carriage frame 14 provided with wheels 15 for ease of moving the machine from place to place.

Twin screws 12 and 13 are driven by an electric motor 16, FIG. 2, through speed reduction gearing 17. Motor 16 is mounted on a frame extension 18, and, as shown, drives reduction gearing 17 by means of a pulley and belt drive 19. A cover 20 is bolted in place over the twin screws, so it may be easily removed for cleaning the screws.

An extrusion head 25 is attached to the discharge end of auger mechanism 10. While any means of attachment may be used, for ease of removal for cleaning purposes a special connector is preferred. Thus, extrusion head 25 is flanged at 26, FIG. 5, as is the auger housing at 27. The flanges fit together face-to-face, and upper and lower clamps 28 and 29, respectively, see especially FIG. 4, fit over the flanges and secure them together. Each of the clamps 28 and 29 extends along one-half of the periphery of the flanges.

Pivotally attached to ears 30, FIG. 4, at opposite ends of the upper clamp 28 are respective levers 31, each having a hook 32 pivotally attached thereto intermediate its length. Hooks 32 engage respective latch bars 33, which are secured between ears 34 located at opposite ends of lower clamp 29. As handles 31 are pulled upwardly, hooks 32 pull the two clamps toward one another and tighten them about the flanges, thereby holding the extrusion head securely to the housing of auger mechanism 10. The handles lock into position when pulled upwardly and toward clamp 28, as shown in FIG. 4, but, to insure against accidental unlocking, locking links 35 are pivotally attached to clamp 28 by means of ears 36 and are swung over handles 31 as shown. The extrusion head is thus easily removed by merely removing the clamps.

As shown, FIG. 6, extrusion head 25 has five extrusion openings 37, although any desired number, more or less, could be used. Passages 38, see FIG. 5, lead from pressure chamber 39 within the head to extrusion openings 37 through respective extrusion nozzles 40. The extrusion head and extrusion openings 37 are preferably designed so that extrusion pressure on and flow of material through the several openings is substantially equal. Such openings preferably lie in a common vertical plane, as shown, FIG. 6.

Extrusion head 25 is itself also preferably designed to be taken apart for easy cleaning. Thus, as shown in FIG. 1, such head has end plates 25a held in place by respective clamping arrangements 41 similar to that which holds head 25 to auger mechanism 10. For this purpose, the main body of head 25 is flanged at each end and the flanges abut end pieces 25a, such flanges and end pieces being embraced by upper and lower portions of clamping arrangements 41.

To enable adjustment of the flow rate of extruded material through each extrusion opening 37, respective valves are provided. To this end, ears 42, FIGS. 5, 7, and 8, are attached, as by welding, to the main body of extrusion head 25 directly in line with the respective extrusion openings. Each has a screw 43 threaded therein, so that the lower end 43a of the screw (formed as a valve element) extends into the nozzle passage 38 leading to the extrusion opening.

Sets of wipers for the respective extrusion openings 37 are provided, in this instance as rotors 44, FIG. 6, mounted in front of the respective openings and each comprising wiper arms 44a radiating side-by-side from and at intervals around a hub mounted for rotation on a shaft in common to all of the rotors.

Thus, a shaft 45 is journaled for rotation in front of and attached to extrusion head 25, in forwardly spaced relationship with extrusion openings 37 and preferably easily removable from the extrusion head for cleaning purposes.

As shown, shaft 45 carries spaced bearing structures 46, FIG. 6, within which it is journaled for rotation. Bearing structures 46 comprise respective bearings 47, FIG. 7, and bearing housings 48, the latter being grooved rearwardly in right angular formation at mutually spaced locations to receive corresponding formations 49a of respective bracket arms 49, which arms are secured to and project forwardly from extrusion head 25.

For removably securing shaft 45 and its rotors 44 in working positions on extrusion head 25, attachment means are provided in the form of levers 50, having forked ends pivotally attached to respective bracket arms 49 as fulcrums and having pivotally attached thereto, intermediate their ends, respective work arms in the form of rods 51 terminating in hooks 51a. Bearing housings 48 are provided with holes 52, FIG. 7, for receiving the ends of the respective hooks 51a, so that, when the handle ends 50a of levers 50 are swung backwardly, as shown in FIG. 7, such bearing housings 48 are pressed securely into and locked within the receiving ends of bracket arms 49.

Figure 3:
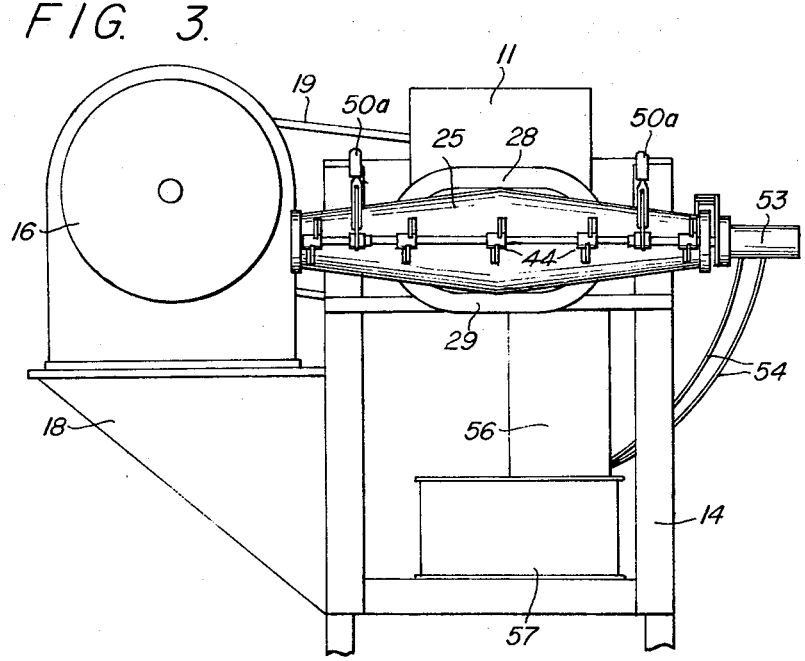

Shaft 45 is powered by a hydraulic motor 53, FIG. 6, which is connected into a circulatory system 54 for a pressurized hydraulic fluid and is secured to extrusion head 25, in position for engagement and disengagement by an end of shaft 25, by means of a bracket 55. System 54 includes a pump 56, FIGS. 1 and 3, and a reservoir 57 for hydraulic fluid.

The free end of each wiper arm 44a of a rotor 44 has a width which comprehends only a fractional part, i.e. a small portion, of the width of the extrusion openings 37 served by that rotor, and each arm has a length which places its free end in a position to wipe across such opening 37 during each rotation of the rotor. As shown, each of the four wiper arms provided in the illustrated embodiment comprehends only one-quarter of the width of the extrusion opening, such arms being dimensioned at their free ends and offset laterally from one another for this purpose. The heavy broken lines in FIG. 8 indicate the four sections, 37a, b, c and d, wiped by the respective arms of the rotor serving the particular extrusion opening 37 there illustrated.

Four wiper arms arranged at equal intervals about the axis of rotation, the free end of each arm comprehending a quarter of the width of the opening, have been found satisfactory, but a fewer or a greater number of arms arranged at unequal intervals and having free ends comprehending a lesser or greater proportional width of the opening may be used, so long as each arm end comprehends only a portion of the area of the extrusion opening concerned, so there is a tearing of chunks from the column being extruded rather than a slicing of uniform pieces from the column.

A safety cover shield 58 for rotors 44 may be provided, as well as a splash shield 59. Levers 50 and rods 51 extend through and move along accommodating slots 60, FIG. 7, provided in cover shield 58.

In operation, chopped and cooled or near frozen, raw, sausage meat is fed into hopper 11 of auger mechanism 10 for conveyance by screws 12 and 13 into extrusion head 25 and out through extrusion openings 37 as extruded columns of sausage meat. Wheeled carriage 14 on which the machine is mounted is positioned so that the extrusion openings 37 and rotors 44 are directly above a receiving bin 61 having a stainless steel conveyor belt (not shown) therewithin.

The wiper arms 44a of each rotor 44 tear random size pieces of sausage meat from the emerging column as shaft 45 rotates, and such pieces are slung into bin 61 and onto the conveyor belt for transport either through a freezing chamber or directly to an area of use, e.g. as pizza topping.

For the manufacture of sausage pieces to be used as pizza topping, it is preferred that the meat fed into the machine be lean pork butts or trimmings that have been chopped in a bowl cutter and have had seasonings added during the chopping. The bowl cutter is preferred to a meat grinder, because it causes less damage to and less oxidation of the meat and the chopped meat is easier to tear into individual chunks.

It is desirable that compression of the chopped sausage meat during extrusion be kept as low as possible to prevent fat in the sausage from liquifying and to prevent emulsification. Extrusion pressures in the machine of the invention are much lower than those ordinarily prevailing in standard meat grinders of sausage stuffers. A desirable temperature for the chopped sausage meat fed to the machine is about 28° to 30° Fahrenheit. At that temperature, the extruded sausage meat will have a temperature of about 28° F., which is an advantageous temperature for the tearing operation performed by the arms of the rotors.

For a production operation, the number and size of the extrusion openings in the machine will be based on the capacity of the conveyor belt within the bin. Auger speed and speed of rotation of the rotors will be adjusted to give desired output of a selected range of chunk sizes. It has been found that rotor speeds of between 40 and 250 RPM give satisfactory results with extrusion openings about ½ inch by 1 inch in size.

Instead of the auger feed mechanism illustrated, a positive displacement pump such as a commercially available "Marlen" twin cylinder food pump manufactured by Marlen Research Corporation, Overland Park, Kansas, may be utilized. If so, it is advantageous that the extrusion head be a length of pipe along the length of which the extrusion openings are formed at spaced intervals by the provision of respective nozzles corresponding to the extrusion nozzles 40 of the illustrated embodiment. The pump may feed into one or both ends of the length of pipe.

Whereas this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

We claim:

1. A method of forming random size pieces of a chopped or ground sausage meat or like material, comprising the steps of continuously extruding, as a continuous column, material of the type specified through an extrusion passage having an unrestricted outlet opening freely into an extrudate-receiving space; and successively and repeatedly tearing respective chunks of material from the extruded column as said column emerges from said outlet, by passing wiping means across different fractional portions of the extrusion outlet.

2. A method of manufacturing random size sausage pieces for use as topping on pizza pies, comprising the steps of chopping lean pork butts or trimmings to a size suitable for use as sausage meat; adding seasoning to the meat as it is being chopped; extruding the chopped and seasoned meat as a column through an extrusion passage having an unrestricted outlet opening freely into an extrudate-receiving space; and successively and repeatedly passing each wiper of a set of wipers, individually, across different fractional areas of said outlet, thereby tearing respective chunks of said meat from the extruded column as said column emerges from said outlet.

3. A method according to claim 2, wherein the chopped sausage meat is cooled to about 28° to 30° F. before being extruded.

4. Apparatus for forming torn, random size pieces of a chopped or ground meat or like material, comprising an extrusion head having at least one extrusion passage having an unrestricted outlet opening freely into an extrudate-receiving space; means for extruding a column of said material through said passage and out said outlet into said space; a set of wipers arranged to individually and successively sweep across different localized areas of said outlet for tearing respective chunks of said material from said column as it is being extruded through said outlet; and means for repeatedly passing the wipers of said set across said outlet during operation of the extruding means, whereby multiple chunks of material are torn free across the width of said column as it is being extruded into said extrudate-receiving space.

5. Apparatus according to claim 4, wherein the set of wipers comprises a rotor in front of the outlet and having a hub and arms extending radially from the hub at intervals therearound and offset laterally from one another; and wherein the means for repeatedly passing the wipers of the set across the outlet comprises means for rotating the rotor.

6. Apparatus according to claim 5, wherein there are a plurality of outlets spaced apart in rectilinear alignment and disposed in a common vertical plane; a rotatable shaft extends along and in front of said plurality of openings; there are a plurality of rotors mounted on said shaft in number and positions corresponding with said openings; and the means for repeatedly passing the wipers across the outlets comprises means for rotating the shaft.

7. Apparatus according to claim 6, wherein the extrusion head includes a pressure chamber having a series of extrusion nozzles leading therefrom and terminating in respective outlets; the extruding means comprises a feed hopper and pressure feeding mechanism arranged to feed material from said hopper under pressure into the pressure chamber of said extrusion head; means removably connecting the extrusion head to said feeding mechanism; and means removably securing the rotor shaft to the extrusion head.

8. Apparatus according to claim 7, wherein the means securing the rotor shaft to the extrusion head comprises bearings and bearing housings carried by the shaft; levers pivotally secured to the extrusion head and having hooked lever arms adapted to engage the respective bearing housings; and mating formations carried by the extrusion head and by the bearing housings, respectively, for locking the shaft securely in position relative to the extrusion head upon operation of said levers.

* * * * *